UNITED STATES PATENT OFFICE.

FRANZ FISCHER, OF CHARLOTTENBURG, GERMANY, ASSIGNOR TO THE FIRM OF HENKEL & CIE., OF DUSSELDORF, GERMANY.

PROCESS OF MAKING PEROXID OF HYDROGEN.

1,128,966.   Specification of Letters Patent.   Patented Feb. 16, 1915.

No Drawing.   Application filed May 7, 1913. Serial No. 766,091.

*To all whom it may concern:*

Be it known that I, FRANZ FISCHER, a citizen of the German Empire, and residing at Charlottenburg, near Berlin, Germany, have invented a certain new and useful Improved Process of Making Peroxid of Hydrogen, of which the following is a specification.

My invention relates to a process of making hydrogen peroxid.

As is well known, oxygen which is dissolved in an electrolyte at atmospheric pressure can be reduced to hydrogen peroxid at the cathode according to the equation:—

$$O_2 + 2H = H_2O_2.$$

For this purpose however only very weak electric currents have heretofore been employed, whereby only very weak hydrogen peroxid solutions have been obtained containing not more than about 0.1%. Such a solution cannot be technically utilized, and evaporation would not pay. Now I have found that by carrying out the electrolysis at a pressure above atmospheric, hydrogen peroxid solutions containing up to three or more percentum of hydrogen peroxid can be obtained in a form which is directly employable for technical purposes. For example, I have saturated the electrolyte at a pressure of 100 atmospheres with oxygen or oxygenous gases and have then carried out the electrolysis under pressure. In this way I have proved that if the anode and cathode chambers are separated, and if *e. g.* amalgamated gold cathodes are employed, even when high current densities are employed, *e. g.* 5 amperes per sq. dcm., it is possible to work with about 2 volts; this is because the saturation of the electrolyte containing oxygen under pressure diminishes the voltage of decomposition. It is obvious that not only must the oxygen or oxygenous gases be introduced, distributed or dissolved in the electrolyte under pressure but the electrolysis itself must be carried out at a pressure above atmospheric.

For the electrolytes I preferably employ acid solutions, *e. g.* those of mineral acids. I can however employ with not quite so good results solutions of the salts of the alkalis or alkaline earths or solutions which are directly alkaline and contain an uncombined alkali or alkaline earth. For example, when employing 1% sulfuric acid as the electrolyte I have obtained yields amounting to 90% of the theoretical value, and in this manner have obtained 3% solutions of hydrogen peroxid. I can only employ not only amalgamated gold cathodes, but also cathodes of other metals *e. g.* of gold, platinum, lead, mercury, nickel or the like. It is essential that the cathode consists of a metal which is attacked either little or not at all by the electrolyte employed. When less value is attached to the purity of the hydrogen peroxid obtained than to a large yield for the energy expended, it is preferable to employ stabilizing admixtures, as *e. g.* boric acid and urea which, as is well known, are able to retard catalytic decomposition of the hydrogen peroxid.

I claim:—

1. A process of making hydrogen peroxid which consists in reducing gaseous oxygen to hydrogen peroxid by continuously forcing oxygen or oxygenous gases into the watery solution of a suitable electrolyte under high pressure and during the simultaneous generation of hydrogen in the electrolyte by electrolysis.

2. A process of preparing hydrogen peroxid which consists in reducing gaseous oxygen to hydrogen peroxid by continuously forcing and distributing oxygen or oxygenous gases into the watery solution of a suitable electrolyte under pressure and during simultaneous generation of hydrogen in the electrolyte by electrolysis.

3. A process of preparing hydrogen peroxid which consists in reducing gaseous oxygen to hydrogen peroxid by continuously forcing and distributing oxygen or oxygenous gases into the watery acid solution of a suitable electrolyte under high pressure and during simultaneous generation of hydrogen in the electrolyte by electrolysis.

4. A process of preparing hydrogen peroxid which consists in reducing gaseous oxygen to hydrogen peroxid by continuously forcing oxygen or oxygenous gas into the watery solution of a suitable electrolyte under high pressure and during simultaneous generation of hydrogen in the electrolyte by electrolysis, adding a stabilizing admixture to the electrolyte.

5. A process of making hydrogen peroxid consisting in impregnating under a pressure greater than atmospheric the aqueous solution of an electrolyte with oxygen or oxygenous gases, in reducing the dissolved oxygen to hydrogen peroxid at the cathode by electrolysis under a pressure greater than atmospheric, and in adding a stabilizing admixture to the electrolyte.

6. A process of making hydrogen peroxid consisting in impregnating under a pressure greater than atmospheric the aqueous acid solution of an electrolyte with oxygen or oxygenous gases, in reducing the dissolved oxygen to hydrogen peroxid at a cathode but little attacked by weak acids by electrolysis under a pressure greater than atmospheric, and in adding a stabilizing admixture to the electrolyte.

In testimony whereof, I affix my signature in the presence of two witnesses.

PROF. DR. FRANZ FISCHER.

Witnesses:
WOLDEMAR HAUPT,
HENRY HASPER.